United States Patent [19]

Kuwana et al.

[11] Patent Number: 5,316,090
[45] Date of Patent: May 31, 1994

[54] ATTITUDE CONTROL DEVICE AND DRILLING-DIRECTION CONTROL DEVICE

[75] Inventors: Shoji Kuwana, Ueda; Yoshihide Kiyosawa, Hotaka; Akio Ikeda, Osaka, all of Japan

[73] Assignee: Harmonic Drive Systems, Inc., Kawasaki, Japan

[21] Appl. No.: 26,790

[22] Filed: Mar. 5, 1993

Related U.S. Application Data

[62] Division of Ser. No. 730,622, Jul. 16, 1991.

[30] Foreign Application Priority Data

Jul. 18, 1990 [JP] Japan .................. 2-189883

[51] Int. Cl.⁵ .................................. E21B 44/00
[52] U.S. Cl. ............................ 175/24; 175/55; 175/56; 175/26; 175/61; 33/304
[58] Field of Search .............. 175/24, 26, 27, 45, 175/55, 56, 61, 62, 74–76, 106, 107; 33/301–304, 328

[56] References Cited

U.S. PATENT DOCUMENTS

| | | | |
|---|---|---|---|
| 2,745,635 | 5/1956 | Zublin | 255/1.6 |
| 2,891,769 | 6/1959 | Page | 175/76 |
| 2,919,897 | 1/1960 | Sims | 175/76 |
| 3,023,821 | 3/1962 | Etherington | 175/76 X |
| 3,042,125 | 7/1962 | Duncan | 175/76 X |
| 3,043,381 | 7/1962 | McNeely | 175/61 X |
| 3,650,338 | 3/1972 | McNeely | 175/61 X |
| 3,713,599 | 1/1973 | Smith et al. | 74/527 X |
| 4,058,163 | 11/1977 | Yandell | 175/55 X |
| 4,303,135 | 12/1981 | Benoit | 175/73 |
| 4,346,768 | 8/1982 | Ross | 74/583 X |
| 4,394,881 | 7/1983 | Shirley | 175/76 |
| 4,436,163 | 3/1984 | Simpson | 74/22 R X |
| 4,476,943 | 10/1984 | Williams | 175/61 |
| 4,506,590 | 3/1985 | Miki et al. | 192/1.21 X |
| 4,548,282 | 10/1985 | Hurtz et al. | 175/61 |
| 4,823,638 | 4/1989 | Ishikawa | 74/640 |
| 4,974,470 | 12/1990 | Ishikawa et al. | 74/640 |
| 5,113,953 | 5/1992 | Noble | 175/61 |

FOREIGN PATENT DOCUMENTS 57-21695   2/1982   Japan .
57-100290  6/1982   Japan .
58-210300  12/1983  Japan .

Primary Examiner—Ramon S. Britts
Assistant Examiner—Roger J. Schoeppel
Attorney, Agent, or Firm—Burns, Doane, Swecker & Mathis

[57] ABSTRACT

An attitude control device has a plurality of harmonic drive mechanisms of the hollow type, preferably first and second harmonic drive mechanisms. First and second rotational members are connected to the outputs of the first and second harmonic drive mechanisms. These rotational members have eccentric hollow portions which rotate eccentrically around the rotational axes of the harmonic drive mechanisms. A member to be driven is placed to extend through the eccentric hollow portions such that it is supportedly contacted with the inner surfaces of the eccentric hollow portions. In operation, the eccentric hollow portions are rotated relative to each other, whereby the member to be driven is controllably oriented to a desired direction.

The attitude control device can be employed as a drillingdirection control device wherein a rotational drill shaft is supported by inner surfaces of eccentric hollow portions of first and second rotational members. These rotational members are rotated by first and second harmonic drive mechanisms. By rotating the eccentric hollow portions, the rotational drilling shaft is changed in orientation from the vertical direction.

5 Claims, 7 Drawing Sheets

ATTITUDE CONTROL DEVICE AND DRILLING-DIRECTION CONTROL DEVICE

This is a divisional of application Ser. No. 07/730,622, filed Jul. 16, 1991.

BACKGROUND OF THE INVENTION

1. Field of the Invention

The present invention relates to an attitude control device for controlling the attitude or direction of a member to be driven such as a rotational shaft, a probe or the like. More specifically, the present invention pertains to an attitude control device having a plurality of harmonic drive mechanisms of the hollow type. The present invention also relates to a drilling-direction control device for a drilling system for oil wells or the like, wherein a plurality of harmonic drive mechanisms of the hollow type are utilized to orient a rotational drill shaft to a desired direction, to thereby control the drilling direction of a drill bit mounted on the end of the rotational drill shaft.

2. Related Art Statement

In various technical fields, attitude or direction control of, for example, a rotational shaft or the like is regarded a highly important technique for enabling a desired motion or operation of a member to be driven. For example, in the machine tool field, the cutting bit or the workpiece have to be precisely brought to a desired position for accurate machining.

On the other hand, in oil well drilling, a controller is provided for varying the drilling direction of a drill bit so as to avoid rock beds. The drilling-direction controller serves also to adjust the drilling direction of the drill bit so that it is precisely oriented in the target direction. Examples of drilling-direction controllers are disclosed, for example, in U.S. patent application Ser. No. 6/158948 filed on Jun. 12, 1980, U.S. Pat. No. 4,303,135 issued to Lloyd F. Benoit on Dec. 1, 1981, and Japanese Patent Public-Disclosure Nos. SHO 57-100290 disclosed on Jun. 22, 1982 and SHO 58-210300 disclosed on Dec. 7, 1983.

SUMMARY OF THE INVENTION

An object of the present invention is to provide a novel attitude control device for controlling the attitude of a member to be driven, which is compact and is capable of controlling the attitude of the member precisely and freely.

Another object of the present invention is to provide a novel drilling-direction control device for a drilling system such as of an oil well drilling system, which employs a drive mechanism silimar to that of the aforesaid attitude control device, whereby the structure of the drilling-direction control device can be simplified and precise controlling operation can be realized.

In order to achieve the above and other objects, according to the present invention, a plurality of harmonic drive mechanisms of the hollow type are employed to realize the precise attitude control. As used herein, the term "harmonic drive mechanism" is defined as one that comprises a rigid circular spline, a flexible spline and a wave generator. The rigid circular spline has inner spline teeth engageable with outer spline teeth formed on the outer surface of the flexible spline. The wave generator is typically comprised of an elliptical cam plate and a ball bearing mechanism inserted between the cam plate and the flexible spline. The flexible spline is elastically deformed in the radial direction according to the elliptical profile of the cam plate to cause the teeth thereof located on or around the major axis of the elliptical profile to engage with the teeth of the rigid circular spline. The thus-formed engaged teeth portions are moved circumferantially with the rotation of the wave generator, whereby relative rotation occurs between the circular and flexible splines. This type of harmonic drive mechanism is disclosed, for example, in U.S. Pat. Nos. 4,823,638 issued on Apr. 25, 1989 and 4,974,470 issued on Dec. 4, 1990, both assigned to the same assignee of the present invention, the contents of which are incorporated herein by reference. The term "harmonic drive mechanism of the hollow type" is used herein to mean one that has a through-hole along the axis of the harmonic drive mechanism.

In one aspect of the present invention, there is provided an attitude control device for controlling the attitude of a member to be driven which comprises a plurality of harmonic drive mechanisms of the hollow type and a plurality of rotational members each connected to the lower-speed output element of one of the harmonic drive mechanisms. Each of the rotational members has an eccentric hollow portion which rotates eccentrically with respect to the rotational axis of the harmonic drive mechanism. A member to be driven is placed to extend through the hollow portions of the respective harmonic drive mechanisms and the eccentric hollow portions of the respective rotational members so that it is supportedly contacted with the inner surfaces of the eccentric hollow portions. When the rotational members are rotated, portions of the member to be driven supported by the eccentric hollow portions are forced to displace in a direction substantially perpendicular to the axis of the member to be driven. In a preferred embodiment of the present invention, a hollow-type motor having a through-hole along the axis thereof is employed as a drive source for the respective harmonic drive mechanisms, wherein the output shaft of the motor is connected to the high-speed input elements of the respective harmonic drive mechanisms and a member to be driven is placed to extend through the through-hole of the motor.

According to the present invention, the harmonic drive mechanisms are driven to rotate the associated rotational members having eccentric hollow portions. The eccentric hollow portions of the respective rotational members are thus rotated eccentrically with respect to the rotational axes of the harmonic drive mechanisms. Since the member to be driven is supported by the inner surfaces of the eccentrically rotating hollow portions, it is forced to displace perpendicularly to its axis at the points supported by the inner surfaces of the respective eccentric hollow portions. The amount of displacement of each point depends on the rotational angle of the eccentric hollow portion. By modifying the amount of relative rotation between the respective eccentric hollow portions, the attitude of the member to be driven, in other words, the orientation of the axis of the member to be driven is set to a desired direction.

In the attitude control device of the present invention, since the harmonic drive mechanism exhibits high response and precise movability, precise and sophisticated control of the attitude of the member to be driven can be realized. Further, the member to be driven is placed in the through-holes of the harmonic drive mechanisms and the eccentric hollow portions of the rotational members, so that the device can be constituted in a compact and simplified manner.

In another aspect of the present invention, there is provided a drilling-direction control device for a drilling system which employs a structure similar to that of the abovementioned attitude control device having a plurality of harmonic drive mechanisms of the hollow type. The drilling-direction control device comprises a plurality of harmonic drive mechanisms of the hollow type and a plurality of rotational members connected to the lower-speed output elements of the respective harmonic drive mechanisms. Each of the rotational members is provided with an eccentric hollow portion located eccentrically with respect to the rotational axis of the associated harmonic drive mechanism. A rotational drill shaft of the drilling system is placed to extend through the through-holes of the harmonic drive mechanisms and the eccentric hollow portions of the rotational members such that when the eccentric hollow portions of the rotational members are rotated by a certain amount, the rotational drill shaft can be elastically deflected in a direction perpendicular to the shaft axis at the portions where the drill shaft is supported by the inner surfaces of the respective eccentric hollow portions.

A hollow-type motor may be employed as a drive source for the harmonic drive mechanisms. Alternatively, the rotational force of the rotational drill shaft of the drilling system can be utilized to drive the harmonic drive mechanisms. In this case, since the need for a separate drive source can be eliminated, the device can be constituted compactly.

In a preferred embodiment, the harmonic drive mechanism and the rotational member are as a whole disposed in a manner not to rotate together with the rotational drill shaft of the drilling system. The mechanism for preventing the rotation of the harmonic drive mechanism and the rotational member as a whole may be constituted by an annular housing mounted in an axially fixed condition around the rotational drill shaft and rotation-preventing projections extending radially outwardly from the outer surface of the annular housing. Any other suitable rotation-preventing means can also be employed.

According to the drilling-direction control device for a drilling system, when the rotational members are rotated relative to each other by means of the associated harmonic drive mechanisms, the portions of the rotational drill shaft supported by the eccentric hollow portions of the respective rotational members are forced to elastically deflect in a direction substantially perpendicular to the axis of the rotational drill shaft. Thus, the drilling direction of the rotational drill shaft, which is defined by the eccentric hollow portions of the rotational members, varies depending on the amounts of relative rotation among the eccentric hollow portions.

In a preferred embodiment of the present invention, first and second harmonic drive mechanisms of the hollow type are provided, and first and second rotational members are provided accordingly. In this arrangement, the orientation of the rotational drill shaft of the drilling system is defined by a straight line passing through the centers of the respective eccentric hollow portions of the rotational members. When the rotational members are rotated relative to each other by a certain amount, the straight line is inclined to a certain orientation by a certain angle, depending on the amount of the relative rotation. The portions of the rotational drill shaft supported by the first and second rotational members are thus forced to deflect so as to orient the inclined straight line. Thereafter, the rotational drill shaft moves along the inclined straight line, so that the drill bit supported on the end of the rotational drill shaft advances along the orientation defined by the inclined straight line. Accordingly, the drilling direction is changed from the original drilling direction.

In the drilling-direction control device of the present invention, the harmonic drive mechanism exhibits high response and precise movability. The device is therefore advantageous in that a high degree of directional control can be realized. It is also advantageous in that the use of the hollow-type harmonic drive mechanisms makes it possible for the directional control device to be provided around the rotational drill shaft of the drilling system in a compact manner so that the spece required for device installation is minimized.

DETAILED DESCRIPTION OF THE PREFERRED EMBODIMENTS

While the present invention will be described in connection with preferred embodiments, it will be understood that this does not limit the invention to the embodiments. On the contrary, it is intended to cover all alternatives, modifications, and equivalents as may be included within the spirit and scope of the invention as defined by the attached claims.

EXAMPLE I

Figure 1:
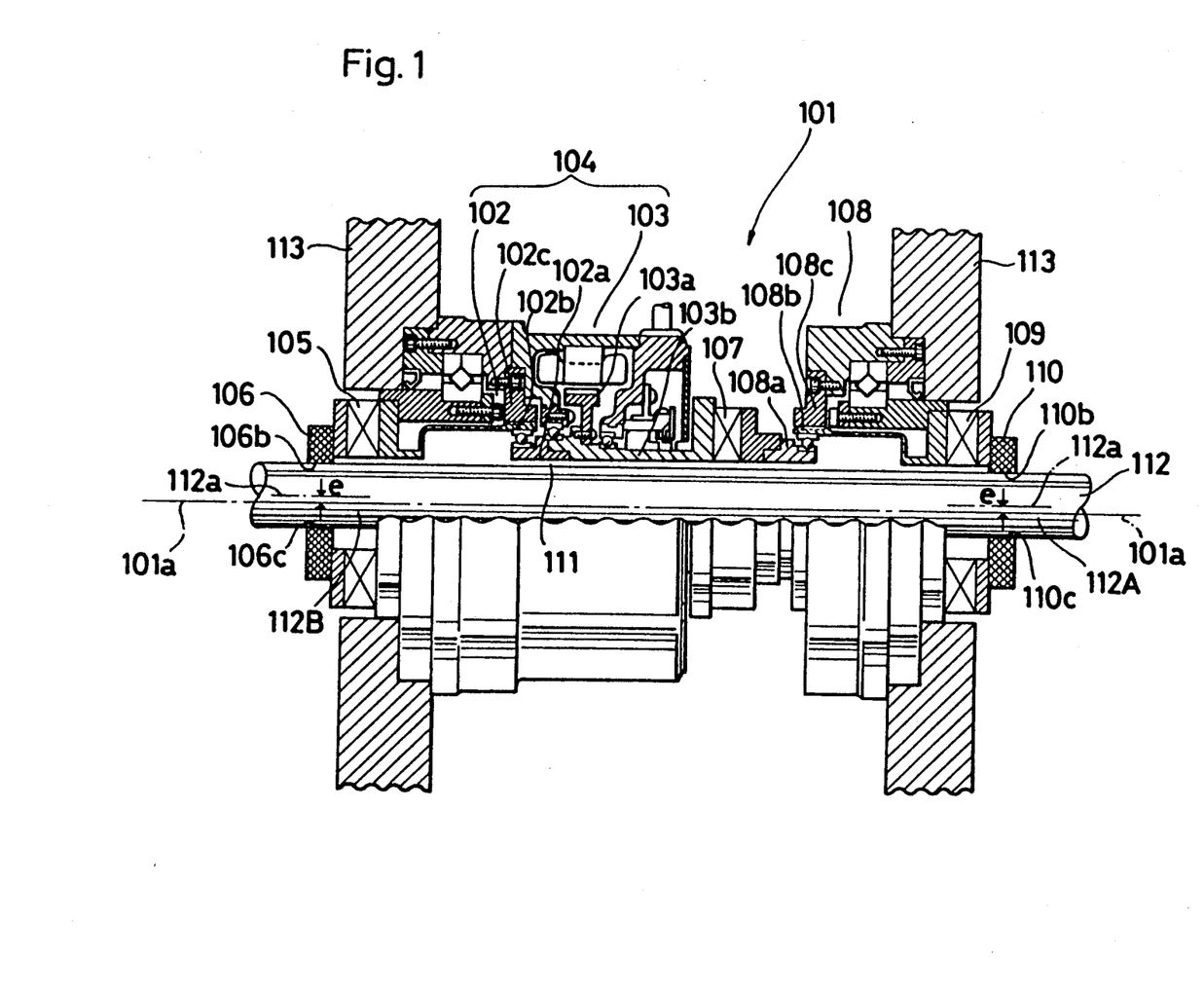
FIG. 1 is a schematic view of an embodiment of the attitude control device according to the present invention.
Figure 2A:
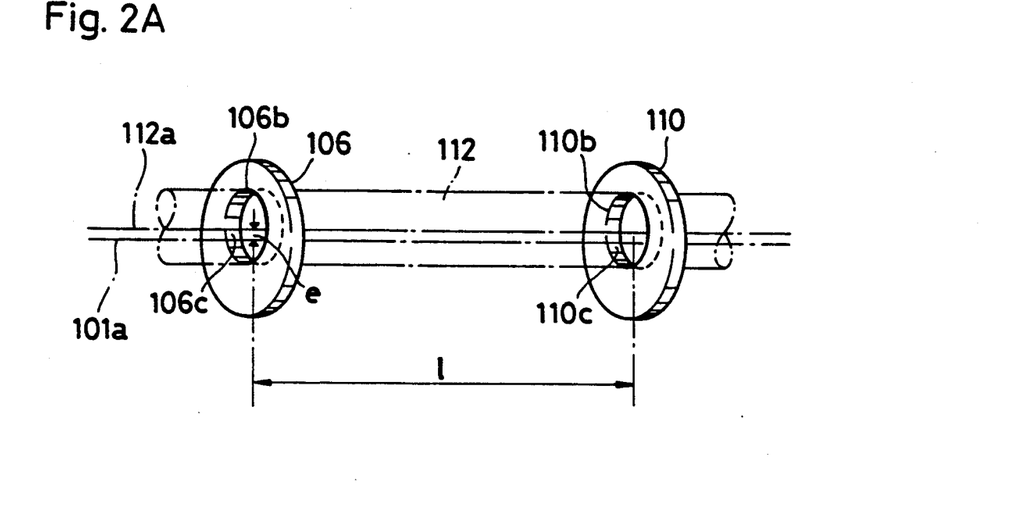
FIGS. 2A and 2B illustrate the attitude controlling operation performed by the device of FIG. 1.
Figure 2B:
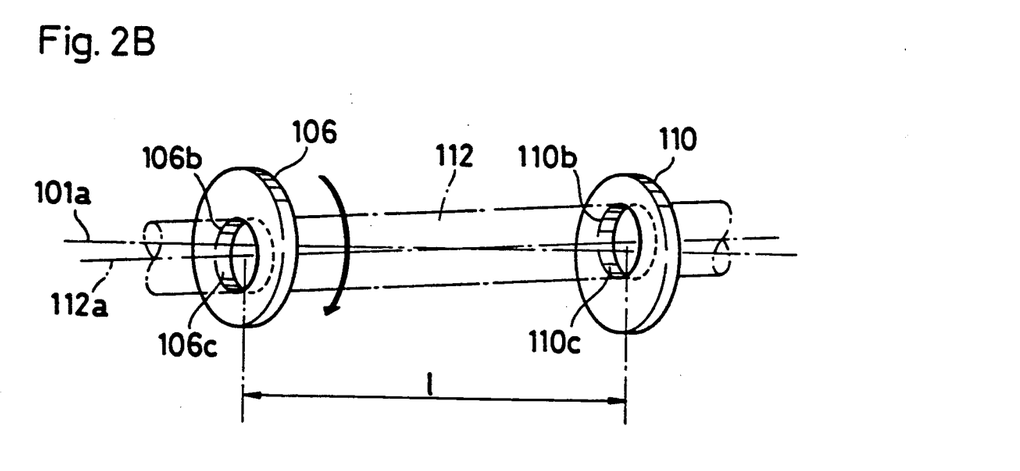

Referring to FIGS. 1 and 2, there will now be described an attitude control device for a non-rotational cylindrical shaft as a member to be driven. As shown in FIG. 1, the attitude control device, generally denoted by reference numeral 101, comprises a hollow-type actuator 104 having a first harmonic drive mechanism of the hollow type 102 and an AC servomotor 103 connected coaxially to the harmonic drive mechanism 102. The servomotor 103 is also of the hollow type having a through-hole along the rotational axis thereof. The hollow-type actuator 104 has one end connected coaxially to a first electromagnetic coupling of the hollow type 105, which in turn is connected at its input side to the lower-speed output element of the hollow-type actuator 104. The electromagnetic coupling 105 is connected at its output side to a first rotational disc 106. The other end of the hollow-type actuator 104 is connected coaxially to a second electromagnetic coupling of the hollow type 107. The second electromagnetic coupling 107 is coaxially connected at its input side with a higher-speed output element of the hollow-type actuator 104, and is coaxially connected at its output side with the input side of a second harmonic drive mechanism 108 of the hollow type. The output side of the second harmonic drive mechanism 108 is connected to the input of a third electromagnetic coupling of the hollow type 109. The output of the third electromagnetic coupling 109 is connected to a second rotational disc 110.

A hollow portion 111 of the device 101 extending along the longitudinal axis thereof is defined by the respective through-holes of the first electromagnetic coupling 105, actuator 104, second electromagnetic coupling 107, second harmonic drive mechanism 108 and third electromagnetic coupling 109. A cylindrical shaft 112 as a member to be driven is placed to extend the hollow portion 111. The first and second rotational discs 106 and 110 are centered on a rotational axis 101a and have eccentric circular-cutout portions 106b and 110b. The central axis 112a passing through the centers of the eccentric circular-cutout portions 106b and 110b is initially set to be parallel to the rotational axis 101a and is offset therefrom distance e. The cylindrical shaft 112 is placed to extend through the eccentric circular-cutout portions 106b and 110b so that it is supportedly contacted with the inner surfaces 106c and 110c of the eccentric circular-cutout portions.

The hollow-type actuator 104 has the servomotor 103 which comprises a rotor 103a and an output hollow shaft 103b connected to the rotor. One end of the output shaft 103b is connected to a wave generator 102a of the first harmonic drive mechanism 102. The first harmonic drive mehcanism 102 serves as a reduction gearing mechanism and comprises the wave generator 102a, a cup-shaped flexible spline 102b encircling the wave generator 102a and a rigid circular spline 102c encircling the flexible spline 102b. The rigid circular spline 102c is fixedly mounted on a housing 113 of the device 101, and the flexible spline 102b is connected to the input of the frist electromagnetic coupling 105. On the other hand, the output hollow shaft 103b of the motor 103 has its other end connected to the input of the second electromagnetic coupling 107.

The second harmonic drive mechanism 108 serves also as a reduction gearing mechanism, which is placed in a mirror-image relationship with respect to the above-mentioned first harmonic drive mechanism 102. The second harmonic drive mechanism 108 comprises a wave generator 108a connected to the output of the second electromagnetic coupling 107, a cup-shaped flexible spline 108b around the wave generator 108a and a rigid circular spline 108c around the flexible spline 108b. The rigid circular spline 108c is fixedly mounted on the housing 113 and the flexible spline 108b is connected to the input of the third electromagnetic coupling 109, which in turn is connected at its output side to the second rotational disc 110.

In operation, the motor 103 is activated to drive the first harmonic drive mechanism 102, so that a decreased rotational output is obtained from the flexible spline 102b. Where the first electromagnetic coupling 105 is set 'on' to be in a connected condition, the output from the flexible spline 102b is delivered via the coupling 105 to the first rotational disc 106. Thus, the disc 106 rotates around the rotational axis 101a and the eccentric circular-cutout portion 106b thereof rotates around the same axis 101a eccentrically. Likewise, where the second electromagnetic coupling 107 is set to be in a connected condition, the motor output shaft 103b is connected to drive the second harmonic drive mechanism 108. The harmonic drive mechanism 108 decreases the high-speed input from the motor according to the reduction ratio thereof and generates a decreased-speed output from the flexible spline 108b. If the third electromagnetic coupling 109 is also set to be in a connected condition, the decreased-speed output is transferred through the connected coupling 109 to the second rotational disc 110. The rotational disc 110 rotates around the rotational axis 101a and the eccentric circular-cutout portion 110b thereof rotates around the same axis eccentrically.

FIGS. 2A and 2B illustrate the change in attitude of the cylindrical shaft 112, in the case where the second rotational disc 110 is maintained not to rotate while the first rotational disc 106 is rotated by an angle of 180 degrees. FIG. 2A shows the initial positions of the first and second rotational discs 106 and 110. The rotational discs 106 and 110 are positioned such that the eccentric circular-cutout portions 106b and 110b are both offset in the same direction from the rotational axis 101a by a distance e. Then the first electromagnetic coupling 105 is connected, while the second and third couplings 107 and 109 are maintained disconnected, whereafter the motor 103 is activated. The high-speed output of the motor is decreased through the first harmonic drive mechanism 102 and is transferred to the first rotational disc 106. By controlling the motor, the first rotational disc 106 is rotated by 180 degrees from its initial position in FIG. 2A and stopped at this position. FIG. 2B shows the thus obtained positions of the first and second rotational discs 106 and 110, wherein the attitude of the cylindrical shaft 112, that is, the orientation of the axis 112a thereof is inclined by an angle $\theta$ from the rotational axis 101a. The value $\theta$ is gained by $$\theta = \tan^{-1}(2e/l)$$

where l is the distance between the first and second rotational discs.

Likewise, the three electromagnetic couplings are selectively connected in order to rotate the first disc 106 and/or second rotational disc 110, whereby sophisticated attitude control of the cylindrical shaft 112 can be realized.

In the above arrangement, the first and second harmonic drive mechanisms 102 and 108 are of the cup-shaped type having the cup-shaped flexible spline. Instead, there can be used a so-called flat-type harmonic drive mechanism which has a flexible spline of the flat ring shape. Further, instead of the harmonic drive mechanism of the hollow type, there can be adopted a solid-type harmonic drive mechanism which has no through-hole along its axis. Furthermore, the first and second harmonic drive mechanisms 102 and 108 may be driven independently by separate hollow-type actuators. Three or more eccentric hollow portions may be employed to control the attitude of a member to be driven.

The attitude control device 101 of the present invention can of course be utilized to control the attitude of a member other than one of cylindrical shape.

EXAMPLE II

Referring to FIGS. 3 to 6, there will be described another example of the present invention applied for directional drilling in an oil well drilling system.

(Overall Structure)

Figure 3:
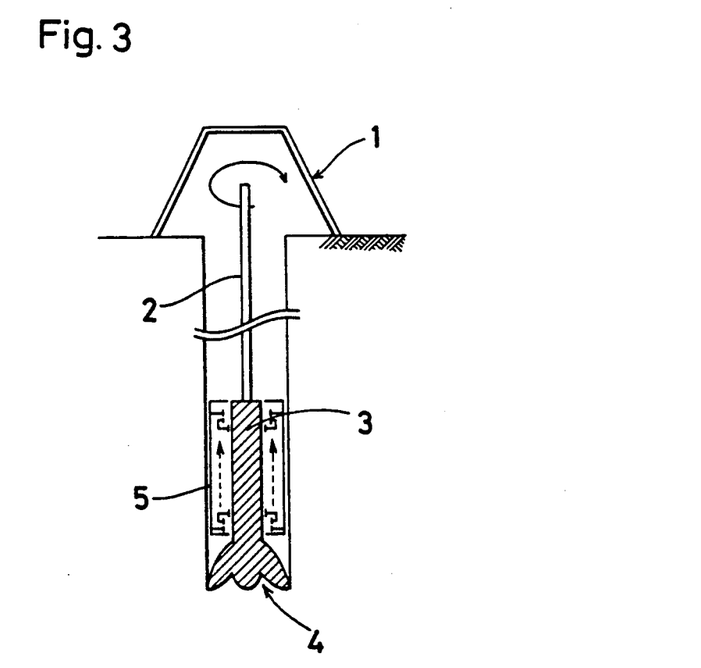
FIG. 3 is a schematic view of an embodiment of the drilling-direction control device for an oil well drilling system according to the present invention.

FIG. 3 illustrates the overall structure of an oil well drilling system according to the present embodiment. The oil well drilling system 1 has a rotational shaft 2, a drill collar 3 connected coaxially on the lower end of the rotational shaft 2 and a drilling bit 4 mounted on the lower end of the drill collar 3. The oil well drilling system 1 also has a drive unit (not shown) for driving the rotational shaft 2 and a drilling-direction control device 5 mounted to surround the drill collar 3.

(Drilling-Direction Control Device 5)

Figure 4A:
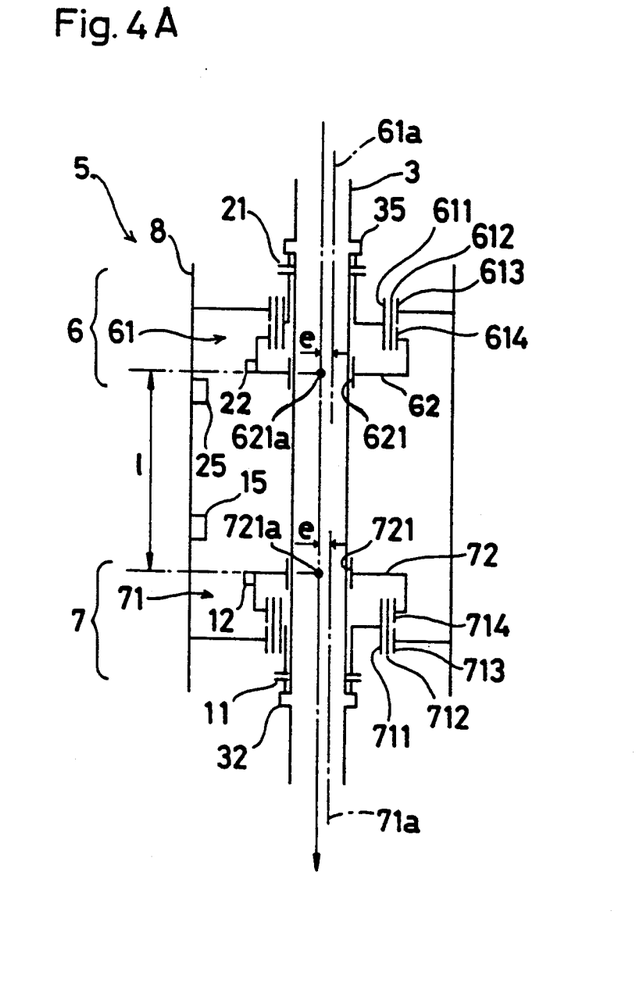
FIGS. 4A to 4C illustrate the directional controlling operation performed by the system of FIG. 3.

As shown in FIG. 4A, the drilling-direction control device 5 comprises an upper directional control unit 6 and a lower directional control unit 7, separated from each other in the vertical direction. The directional control units 6 and 7 are mainly comprised of harmonic drive mechanisms 61 and 71, respectively. The rotational inputs to the harmonic drive mechanisms 61 and 71 are introduced via electromagnetic couplings 21 and 11 from the drill collar 3, respectively. The decreased-speed outputs from the respective harmonic drive mechanisms 61 and 71 are transferred to rotational discs 62 and 72, whereby the discs 62 and 72 rotate relative to each other to thereby control the drilling direction of the drill collar 3. Since the directional control units 61 and 71 are of the same structure, the lower directional control unit 71 will mainly be explained in the following.

(Directional Control Unit 7)

Figure 5A:
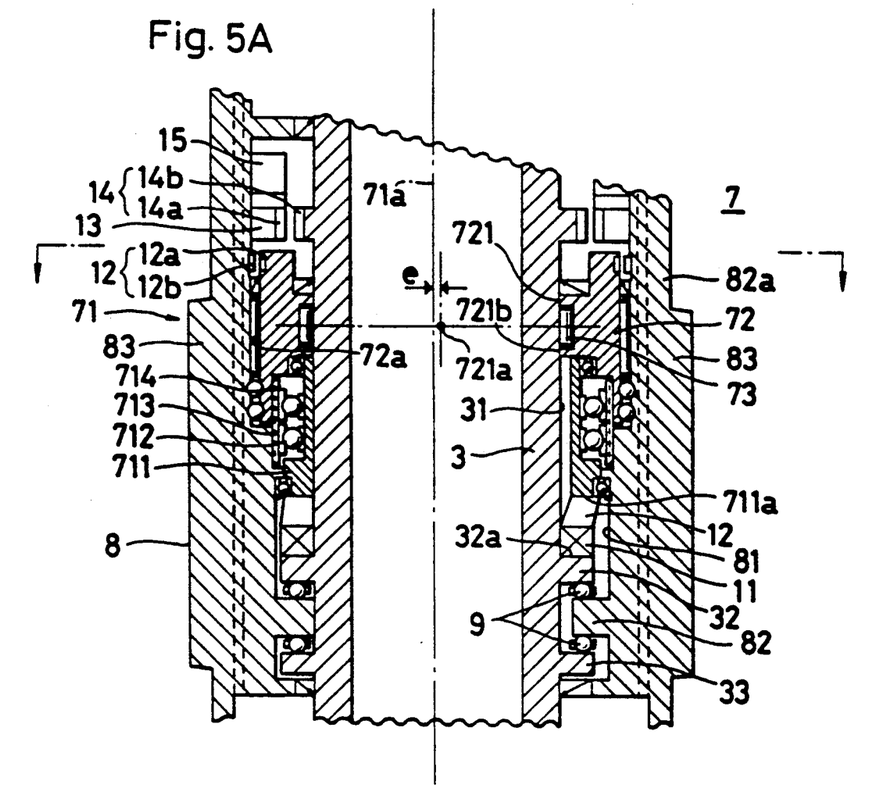
FIG. 5A is a partial longitudinal sectional view in an enlarged scale, showing one of the directional control units provided in the system of FIG. 3.
Figure 5B:
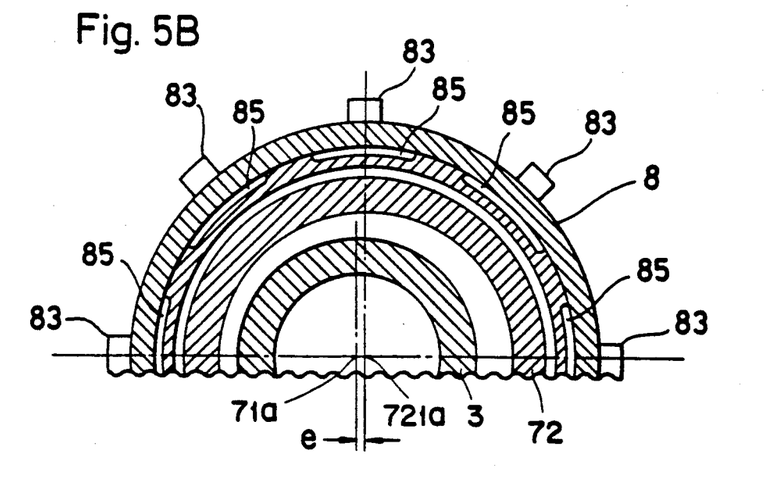
FIG. 5B is a partial cross sectional view of the directional control unit of FIG. 5A; and, FIG. 6 is a schematic block diagram of the control system for the system of FIG. 3.

As shown in FIG. 5, the lower directional control unit 7 consists mainly of the harmonic drive mechanism of the hollow type 71 serving as a reduction gearing mechanism. The harmonic drive mechanism 71 has a hollow-type wave generator 711 encircling the drill collar 3, a flexible spline of the flat type 712 coaxially encircling the wave generator 711 and two rigid circular splines 713, 714 coaxially encircling the flexible spline 712. The rigid circular spline 713 is integrally formed on the inner surface of the annular housing 8, whereas the other rigid circular spline 714 is integrally formed on the inner surface of a rotational disc 72 which is supported rotatably on the inner surface of the annular housing 8.

The rotational disc 72 is formed with an eccentric hollow portion 721 whose center 721a is offset from a rotational axis 71a of the harmonic drive mechanism 71 by a given distance e. The eccentric hollow portion 721 has a diameter suitable for receiving the drill collar 3 therein and is provided at its inner surface 721b with a roller bearing mechanism 73 supportingly contacting the outer surface 31 of the drill collar 3.

The drill collar 3 is formed at its outer surface with a pair of annular projections 32 and 33, between which an annular projection 82 formed on the inner surface 81 of the housing 8 is inserted via a pair of ball bearing mechanisms 9, 9. Hence, the housing 8 is rotatably mounted around the drill collar 3, while it moves integrally with the drill collar 3 in the axial direction. The annular projection 32 of the drill collar 3 has an annular surface 32a facing upwardly. This surface 32a is connected to a lower annular surface 711a of the wave generator 711 via an electromagnetic coupling 11 and an Oldham's coupling 12 disposed in this order from the lower side.

On the other hand, a detection unit 12 is disposed between the outer surface 72a of the rotational disc 72 and the inner surface 81 of the housing B. The detection unit 12 comprises a pair of detecting elements 12a, 12b mounted one on the rotational disc 72 and one on the housing 8, and detects the amount of relative rotation therebetween. A battery unit 13 is also provided above the detection unit 12 for driving the above electromagnetic coupling. In addition, a generator unit 14 is also provided for carrying out floating charge of the battery unit 13. This generator unit 14 comprises a stator 14a mounted on the housing 8 and a rotor 14b mounted on the drill collar 3. Adjacent to the battery unit 13, there is provided on the inner surface 81 of the housing a control unit 15 for controlling the operation of the electromagnetic coupling and the like.

The housing 8 is formed on its outer surface 82a with a plurality of projections 83 formed radially outward and extending in the axial direction. The projections 83 are designed to penetrate into the inner wall of a wellbore formed by the drilling bit 4 to prevent the housing 8 from rotating together with the drilling collar 3. The housing 8 is formed therein with a plurality of throughholes 85 extending axially and disposed circumferantially at equal angles, which define slurry circulating paths from the drilling bit side to the earth surface.

(Directional Control Unit 6)

The upper directional control unit 6 is also assembled inside the annular housing 8. As shown in FIG. 4A, similar to the above-mentioned directional control unit 7, the directional control unit 6 is comprised mainly of the harmonic drive mechanism of the hollow type 61. The harmonic drive mechanism 61 serves as a reduction gearing mechanism and has a wave generator 611, flexible spline 612 and two rigid circular splines 613, 614. The rigid circular spline 613 is formed on the inner surface 81 of the annular housing 8, while the other rigid circular spline 614 is formed on the rotational disc 62. The rotational disc 62 is formed with an eccentric hollow portion 621, into which the drilling collar 3 is placed to penetrate rotatably via a bearing mechanism. The rotational input to the harmonic drive mechanism 61 is transferred from the drilling collar 3 through an annular projection 35 formed on the outer surface of the drilling collar 3 and an electromagnetic coupling 21. The coupling 21 is driven by means of a drive unit 25 similar to the drive unit 15 of the lower directional control unit 7. The amount of rotation of the rotational disc 62 relative to the annular housing 8 is detected by a detection unit 22 similar to the detection unit 12 of the lower directional control unit 7.

(Control System)

Figure 6:
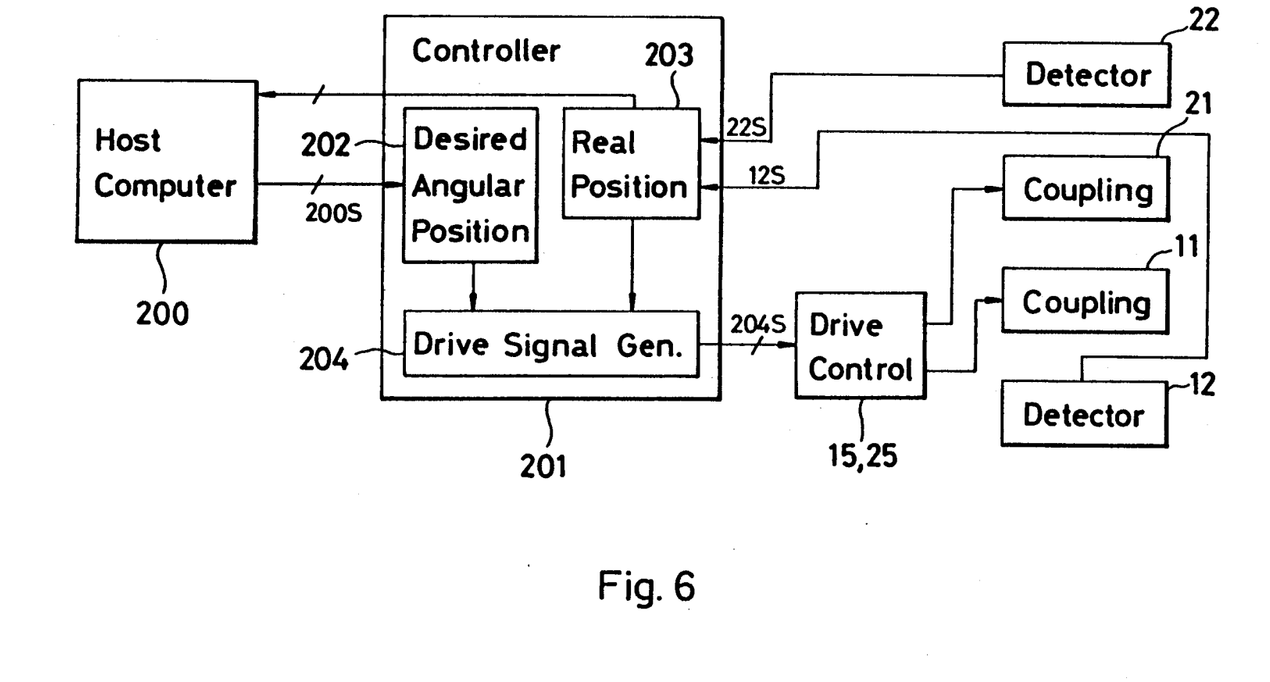

FIG. 6 illustrates a block diagram of a control system for the oil well drilling system 1. The control system has a host computer unit 200 for overall control of the oil well drilling system 1 and a controller 201 for the drilling-direction control device 5. The host computer 200 has an output for generating a control signal 200S representing the orientation and angle of the drilling direction. The controller 201 has a calculating circuit 202 for receiving the control signal 200S and for calculating desired rotational positions of the respective rotational discs 62 and 72 in responsive of the received signal 200S. The controller 201 has a real rotational position detecting circuit 203 which receives detected signals 12S and 22S from the detection units 12 and 22 and, based on the received signals, obtains the real angular positions of the respective rotational discs 62 and 72. The controller 201 also has a drive signal generating circuit 204 which receives the desired rotational positions from the calculating circuit 202 and the real rotational positions from the circuit 203, and generates drive signals 204S for driving the harmonic drive mechanisms 61 and 71. The generated drive signals 204S are supplied to the control units 15 and 25 for the harmonic drive mechanisms. In response to the drive signals 204S, the control units 15 and 25 control the electromagnetic couplings 11 and 21, and drive the harmonic drive mechanisms 61 and 71, whereby the rigid circular splines 614 and 714 are rotated to the desired angular positions and fixed thereat. Hence, the rotational discs 62 and 72 formed integrally with the rigid circular splines 614 and 714 are set to the desired angular positions. The above-mentioned operation can be carried out in accordance with control programs prestored in the host computer 200.

(Drilling-Direction Control)

Figure 4B:
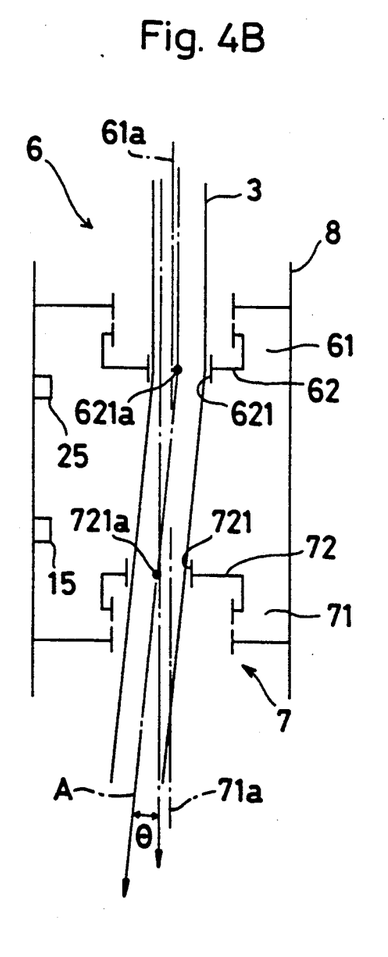

The directional drilling performed by the above-constituted drilling-direction control device 5 will now be explained with reference to FIGS. 4A to 4C. FIG. 4A illustrates the normal (vertical) drilling condition, wherein the centers 621a and 721a of the eccentric hollow portions 621 and 721 are both offset in the same direction (left side in the drawing) from the rotational axes 61a and 71a of the harmonic drive mechanisms 61 and 71 by a maximum distance e, so that the amount of relative rotation between the eccentric hollow portions 621 and 721 is zero, that is, the rotational discs 61 and 71 are at the same angular positions.

The drilling collar 3 in the straight state can be elastically deflected as follows: Only the electromagnetic coupling 21 is changed to be in a connected condition. Then the harmonic drive mechanism 61 is driven to rotate its rigid circular spline 614 by an angle of 180 degrees from the initial angular position. Since the rigid circular spline 614 is integrally formed on the rotational disc 62 having the eccentric hollow portion 621, the rotational disc 62 and its eccentric hollow portion 621 are simultaneously rotated by 180 degrees. The result is that the center 621a of the eccentric hollow portion 621 is shifted to the right side from the rotational axis 61a by a maximum amount e as shown in FIG. 4B. In other words, the center 621a of the eccentric hollow portion 621 is shifted by 2e to the right from its initial position in FIG. 4A. The other eccentric hollow portion 721 maintains in its initial angular position, so that the center 721a thereof is located left of the rotational axis 71a by a distance e. Accordingly, the straight line A passing through the centers 621a and 721a comes to incline by an angle $\theta$ from the vertical direction. The value $\theta$ is defined by the following equation:

$$\theta = \tan^{-1}(2e/l)$$

where l is the distance between the centers 621a and 721a. In the conventional oil well drilling system, the value of $\theta$ is preferably in the range of about 0.5 to about 0.7 degrees. The distace l is set to be as short as possible, preferably about 2 meters. Hence, the drilling collar 3 is deflected so as to follow the straight line A, and the drilling direction is changed to that defined by the straight line A.

Figure 4C:
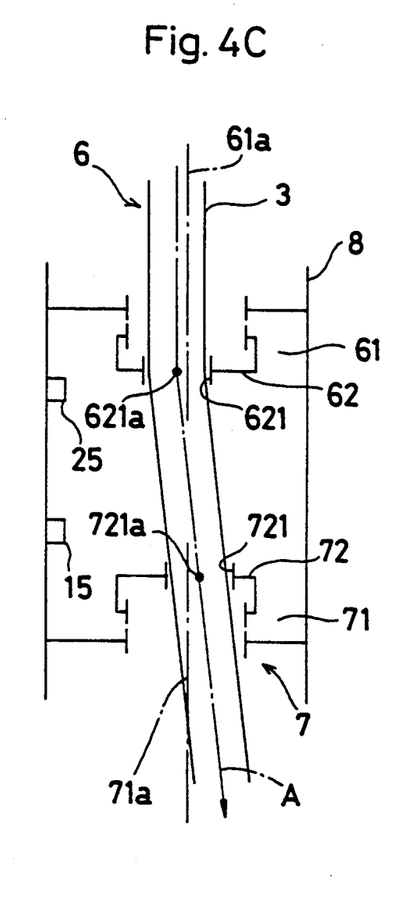

On the other hand, where only the lower rotational disc 72 is rotated 180 degrees from its initial angular position, the straight line A comes to incline $\theta$ in the opposite direction, as shown in FIG. 4C, and the drilling direction is changed to this direction accordingly. Likewise, the amount of relative rotation between the rotational discs 62 and 72 is controlled to thereby change the drilling direction to a desired one.

In the above arrangement, two harmonic drive mechanisms 61 and 71 are utilized to rotate the rotational discs 62 and 72. Alternatively, three or more harmonic drive mechanisms, each having a rotational disc connected thereto, may be utilized to deflect the rotational shaft of the oil well drilling system in order to change the drilling direction. In addition, the harmonic drive mechanisms 61 and 71 may be driven by a servomotor of the hollow type. It is preferable that the servomotor be disposed between the drilling collar 3 and the annular housing 8.

The present invention can also be applied to other well drilling systems for water, hot springs, natural gas, geothermal fluid or the like. It can also be applied to directional drilling in other types of drilling systems, for example to tunnel drilling systems emplying the jacking method.

We claim:

1. An attitude control device comprising a plurality of harmonic drive mechanisms of the hollow type and at least one rotational member connected to an output of said harmonic drive mechanisms, said rotational member having an eccentric hollow portion which rotates eccentrically around a rotational axis of said harmonic drive mechanisms, a member to be driven being placed to extend through the hollow portions of said harmonic drive mechanisms and said eccentric hollow portions of said rotational member so that inner surfaces of said eccentric hollow portions are supportingly contacted with said member to be driven, whereby portions of said member to be driven, which are supported by said inner surfaces of said eccentric hollow portions, are displaced in a direction substantially perpendicular to the axis of said member to be driven by rotating said rotational member relative to one another.

2. An attitude control device according to claim 1, further comprising at least one hollow-type motor having a through-hole along its axis and a control means for selectively controlling transfer of an output rotational force of said motor to said harmonic drive mechanisms, and wherein said member to be driven is placed to extend through said through-hole of said motor.

3. An attitude control device according to claim 2, wherein said harmonic drive mechanisms are first and second harmonic drive mechanisms, and further including a second rotational member, said rotational members are first and second rotational members connected one each to said first and second harmonic drive mechanisms.

4. An attitude control device according to claim 3, wherein said rotational members are of a disc shape and said eccentric hollow portions are of a circular shape, and wherein said member to be driven is a cylindrical member.

5. An attitude control device according to claim 4, wherein said control means comprises three couplings disposed one each between said first harmonic drive mechanism and said first rotational member, between said motor and said second harmonic drive mechanism, and between said second harmonic drive mechanism and said second rotational member.

* * * * *